United States Patent
Martinsson (10) Patent No.: US 11,847,855 B2
(45) Date of Patent: Dec. 19, 2023

(54) VARIABLE PIXEL BINNING IN AN OPTICAL BIOMETRIC IMAGING DEVICE

(71) Applicant: Fingerprint Cards AB, Gothenburg (SE)

(72) Inventor: Hans Martinsson, Gothenburg (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 206 days.

(21) Appl. No.: 17/425,138

(22) PCT Filed: Dec. 11, 2019

(86) PCT No.: PCT/SE2019/051265
§ 371 (c)(1),
(2) Date: Jul. 22, 2021

(87) PCT Pub. No.: WO2020/162805
PCT Pub. Date: Aug. 13, 2020

(65) Prior Publication Data
US 2022/0103765 A1 Mar. 31, 2022

(30) Foreign Application Priority Data
Feb. 4, 2019 (SE) .................. 1950128-7

(51) Int. Cl.
*G06V 40/13* (2022.01)
*H04N 25/42* (2023.01)
(Continued)

(52) U.S. Cl.
CPC .......... *G06V 40/1329* (2022.01); *G06F 21/32* (2013.01); *G06V 10/147* (2022.01);
(Continued)

(58) Field of Classification Search
CPC .......... G06V 40/1329; G06V 40/1318; G06V 10/17; G06V 10/147; H04N 25/42; G06F 21/32; G06F 2218/02
See application file for complete search history.

(56) References Cited

U.S. PATENT DOCUMENTS

2005/0012968 A1* 1/2005 McCaffrey ............. H04N 3/155
348/E3.018
2008/0252602 A1 10/2008 Kakarala et al.
(Continued)

FOREIGN PATENT DOCUMENTS

| EP | 1499112 A2 | 1/2005 |
|---|---|---|
| EP | 2023611 A2 | 2/2009 |

(Continued)

OTHER PUBLICATIONS

PCT International Search Report and Written Opinion dated Mar. 11, 2020 for International Application No. PCT/SE2019/051265, 10 pages.
Extended European Search Report dated Feb. 28, 2022 for EP Application No. 19914298.5, 9 pages.

*Primary Examiner* — Stephen G Sherman
(74) *Attorney, Agent, or Firm* — RMCK Law Group, PLC (57) ABSTRACT

The present invention relates to a method of configuring an optical biometric imaging device comprising a photodetector pixel array, the method comprising: acquiring a biometric image of a biometric object using a first binning setting for binning of detection signals from subarrays of the photodetector pixels into a single pixel value; determining a measure indicative of the feature resolution of the biometric image; and determining, when the measure indicates that the feature resolution is below a feature resolution threshold, a second
(Continued)

binning setting adapted to provide a higher feature resolution compared to the feature resolution of the biometric image.

17 Claims, 9 Drawing Sheets

(51) Int. Cl.
   *G06F 21/32* (2013.01)
   *G06V 10/10* (2022.01)
   *G06V 10/147* (2022.01)

(52) U.S. Cl.
   CPC .......... *G06V 10/17* (2022.01); *G06V 40/1318* (2022.01); *H04N 25/42* (2023.01); *G06F 2218/02* (2023.01)

(56) References Cited

U.S. PATENT DOCUMENTS

| | | |
|---|---|---|
| 2009/0067684 A1 | 3/2009 | Mainguet |
| 2015/0097936 A1 | 4/2015 | Simske et al. |
| 2017/0013217 A1 | 1/2017 | Lee et al. |
| 2017/0017824 A1 | 1/2017 | Smith et al. |
| 2017/0206396 A1 | 7/2017 | Sun et al. |
| 2019/0311176 A1* | 10/2019 | Haddad .............. G06V 40/1318 |

FOREIGN PATENT DOCUMENTS

| | | |
|---|---|---|
| WO | 2017211152 A1 | 12/2017 |
| WO | 2018093798 A1 | 5/2018 |

* cited by examiner

VARIABLE PIXEL BINNING IN AN OPTICAL BIOMETRIC IMAGING DEVICE

CROSS-REFERENCE TO RELATED APPLICATIONS

This application is a 371 U.S. National Stage of International Application No. PCT/SE2019/051265, filed Dec. 11, 2019, which claims priority to Swedish Patent Application No. 1950128-7, filed Feb. 4, 2019. The disclosures of each of the above applications are incorporated herein by reference in their entirety.

FIELD OF THE INVENTION

The present invention relates to a method of configuring an optical biometric imaging device comprising a photodetector pixel array, to an optical biometric imaging device, and to a computer program product.

BACKGROUND OF THE INVENTION

Biometric systems are widely used as means for increasing the convenience and security of personal electronic devices, such as mobile phones etc. Fingerprint sensing systems, in particular, are now included in a large proportion of all newly released consumer electronic devices, such as mobile phones.

Optical fingerprint sensors have been known for some time and may be a feasible alternative to e.g. capacitive fingerprint sensors in certain applications. Optical fingerprint sensors may for example be based on the pinhole imaging principle and/or may employ micro-channels, i.e. collimators or microlenses to focus incoming light onto an image sensor.

In an optical fingerprint sensor, the image under the lens will be a demagnified version of the object, i.e. the fingerprint. This is the case in any imaging optical system. The amount of demagnification is roughly given by the ratio of the object distance, i.e. the distance between object and the lens, and the image distance, i.e. the distance between the lens and image.

In case for example the object distance increases, then the image resolution will be reduced and this causes a reduction in biometric performance. The user may for example decide to add a protection glass on the display which increases the object distance.

It is therefore of interest to be able to at least maintain the image resolution even if e.g. the object distance or the image distance changes.

SUMMARY

In view of above-mentioned and other drawbacks of the prior art, it is an object of the present invention to provide a configuration method which at least alleviates the above by being able to vary the binning of pixels.

According to a first aspect of the invention, there is provided a method of configuring an optical biometric imaging device comprising a photodetector pixel array.

The method comprises acquiring a biometric image of a biometric object using a first binning setting for binning of detection signals from subarrays of the photodetector pixels into a single pixel value.

The method further comprises determining a measure indicative of the feature resolution of the biometric image, and determining, when the measure indicates that the feature resolution is below a feature resolution threshold, a second binning setting adapted to provide a higher feature resolution compared to the feature resolution of the biometric image.

The present invention is based on the realization to adjust the binning of the pixels in order to improve the feature resolution. By adjusting the binning of pixels, the projected pixel size is adjusted and the feature resolution may be improved.

Binning of pixels is often used for reducing the amount of data to be transferred from the image sensor and generally refers to combining two or more pixels into a single data point, i.e. into a single larger area pixel. For example, 2×2, or 3×3, or 4×4, etc. pixels may be binned into a larger pixel, e.g. 4 times larger, 9 times larger, and 16 times larger respectively, than a single pixel.

The amount of binning tolerable in an imaging system is determined by the projected pixel size, i.e. the size of the pixel as projected in the object plane. The projected pixel size may be given by the presently binned photodetector pixel size multiplied with the optical biometric imaging device's demagnification factor. As a suggestion, the projected pixel size should be <¼ of the smallest resolvable biometric feature to keep the effect of the pixel size small.

The demagnification factor indicates by which factor that a feature in the object plane is demagnified in the image plane by the imaging system.

In case a change in the optical biometric imaging device occurs which affects the projected pixel size and thus also the image resolution, it was realized to configure the optical biometric imaging device by adjusting the binning to thereby change the projected pixel size. Thus, by monitoring a measure indicative of the feature resolution of the biometric image, it is possible to determine when the projected pixel size is too large. In response to an inappropriate projected pixel size, a second binning setting is determined in order to reduce the projected pixel size and therefore also improve the resolution of the biometric image.

Accordingly, the invention provides for adjusting the binning of pixels in order to configure the optical biometric imaging device and thereby improve the resolution of the subsequently obtained biometric images.

According to embodiments, the measure indicative of the feature resolution is a projected pixel size. The projected pixel size may be determined from the acquired biometric image. If the projected pixel size is large then the resulting feature resolution is low which may lead to that some features will not be resolvable in the image. If the projected pixel size is too large, then the second binning setting will result in a smaller projected pixel size.

According to embodiments, with the second binning setting, detection signals from fewer pixels may be combined compared to with the first binning setting. Thus, the projected pixel size is reduced in order to increase the image resolution.

According to embodiments, the method may comprise acquiring a second biometric image of the biometric object using the second binning setting. Consequently, the second biometric image with improved image resolution and thus improved biometric performance may be used for biometric authentication.

According to embodiments, the method may comprise determining a second measure indicative of the feature resolution of the second biometric image; and determining, when the second measure indicates that the feature resolution is below the feature resolution threshold, a further binning setting adapted to provide a higher feature resolution compared to the feature resolution of the second biometric image. Accordingly, the method may advantageously proceed with further adjustments of the binning setting if the second biometric image also does not fulfilled the feature resolution threshold. This may even continue until the measure indicative of the feature resolution indicates a satisfactory feature resolution.

According to embodiments, the method may comprise acquiring further images with further binning settings for which further measures indicative of the feature resolution are determined, until the measure indicates a feature resolution which exceeds the feature resolution threshold, selecting the binning setting for which the respective measure indicates a feature resolution that exceeds the feature resolution threshold.

Accordingly, the method may be repeated continuously until a binning setting has been found which provides a satisfactory feature resolution.

The subarray of photodetector pixels may be a square, rectangular, or a circular subarray, although other possible subarrays are also possible.

Subsequent binning settings may reduce the number of rows of pixels in each bin by one, and the number of columns of pixels by one.

In some possible embodiments, subsequent binning settings reduces the number of rows of pixels in each bin by more than one, and the number of columns of pixels by more than one.

The binning may be symmetric or asymmetric. In a symmetric binning the number or rows and columns are equal. In an asymmetric binning the number or rows and columns are not equal, i.e. 2×3, 2×4, 3×2, 2×1, etc.

The feature resolution mentioned above may be a first feature resolution.

In embodiments, it may be included to determine, when the measure indicates that the feature resolution exceeds a second feature resolution threshold, a third binning setting adapted to provide a lower feature resolution compared to the feature resolution of the biometric image.

The second feature resolution threshold is preferably indicative of a higher feature resolution than the first feature resolution.

Accordingly, in response to an inappropriate projected pixel size, a third binning setting is determined in order to increase the projected pixel size and therefore also reduce the resolution of the biometric image. In most cases it is advantageous to have a small projected pixel size. However, the resolution may be limited by other components of the imaging system or one may want to reduce the amount of data transferred from the biometric imaging device.

According to a second aspect of the invention, there is provided an optical biometric imaging device configured to be arranged under an at least partially transparent display panel and configured to capture an image of an object located on an opposite side of the transparent display panel, the biometric imaging device comprising: an image sensor comprising a photodetector pixel array; an array of light defining elements, wherein each light defining element is configured to define a subarray of pixels which receives light from the corresponding light defining element, a control unit connected to the image sensor and configured to: control the image sensor to acquire a first biometric image of a biometric object using a first binning setting for binning of detection signals from subarrays of the photodetector pixels into a single pixel value; determine a measure indicative of the feature resolution of the first biometric image, and determine, when the measure indicates that the feature resolution is below a feature resolution threshold, a second binning setting adapted to provide a higher feature resolution compared to the feature resolution of the first biometric image.

By means of the present disclosure, a biometric imaging device is provided which is readily integrated in a display panel to provide in-display fingerprint sensing functionality, and where the image resolution may be adjusted by adjusting the binning setting of the image sensor.

The outer surface of a display panel under which the biometric imaging device is arranged may also be referred to as a sensing surface. The operating principle of the described biometric imaging device is that light emitted by pixels in the display panel will be reflected by e.g. a finger placed on the sensing surface, and the reflected light is received by the light defining elements and subsequently transmitted onto a corresponding subarray of pixels. An image of a portion of a finger can be captured for each subarray. By combining the images from all of the light defining elements, an image representing the fingerprint can be formed and subsequent biometric verification can be performed.

The control unit is configured to control which binning setting is to be used.

According to embodiments, the light defining elements may be microlenses. Each microlens may be configured to redirect light onto a subarray of pixels in the photodetector pixel array.

The optical biometric imaging device is preferably configured as an optical fingerprint imaging device.

Further effects and features of the second aspect of the invention are largely analogous to those described above in connection with the first aspect of the invention.

According to a third aspect of the invention, there is provided an electronic device comprising: a transparent display panel; the optical biometric imaging device according to any one of the embodiments of the second aspect, and processing circuitry configured to: receive a signal from the optical biometric imaging device indicative of a fingerprint of a finger touching the transparent display panel, perform a fingerprint authentication procedure based on the detected fingerprint.

Various types of displays can be used in accordance with embodiments. For example display panels based on OLED, u-LED with any type of tri-stimulus emission like RGB, CMY or others.

The electronic device may be e.g. a mobile device such as a mobile phone (e.g. Smart Phone), a tablet, a phablet, etc.

Further effects and features of the third aspect of the invention are largely analogous to those described above in connection with the first aspect and the second aspect of the invention.

According to a fourth aspect of the invention, there is provided a computer program product comprising a computer readable medium having stored thereon computer program means for controlling an optical biometric imaging device, the optical biometric imaging device comprising an image sensor and a control unit, wherein the computer program product comprises: code for determining a measure indicative of the feature resolution of a biometric image acquired with a first binning setting; and code for determining, when the measure indicates that the feature resolution is below a feature resolution threshold, a second binning setting adapted to provide a higher feature resolution compared to the feature resolution of the biometric image.

Further effects and features of the forth aspect of the invention are largely analogous to those described above in connection with the preceding aspects of the invention.

Furthermore, the inventive concept is also applicable to the case when the feature resolution is unnecessarily high. Accordingly it was also realized to configure the optical biometric imaging device by adjusting the binning to thereby increase the projected pixel size. Thus, by monitoring a measure indicative of the feature resolution of the biometric image, it is possible to determine when the projected pixel size is too small. In response to an inappropriate projected pixel size, a third binning setting is determined in order to increase the projected pixel size and therefore also reduce the resolution of the biometric image. In most cases it is advantageous to have a small projected pixel size. However, the resolution may be limited by other components of the imaging system or one may want to reduce the amount of data transferred from the biometric imaging device.

In accordance with the above, it is therefore provided a fifth aspect of the invention in the form of a method of configuring an optical biometric imaging device comprising a photodetector pixel array, the method comprising: acquiring a biometric image of a biometric object using a first binning setting for binning of detection signals from subarrays of the photodetector pixels into a single pixel value; determining a measure indicative of the feature resolution of the biometric image; and determining, when the measure indicates that the feature resolution exceeds a second feature resolution threshold, a third binning setting adapted to provide a lower feature resolution compared to the feature resolution of the biometric image.

The second feature resolution threshold preferably indicates a higher feature resolution than the first feature resolution threshold.

With this fifth aspect, the projected pixel size is thus reduced until a satisfactory feature resolution is reached.

Further effects and features of the fifth aspect of the invention are largely analogous to those described above in connection with the preceding aspects of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIG. 3b schematically illustrates a further configuration of the biometric imaging device illustrated in FIG. 3a;

FIG. 4a-c conceptually illustrates the concept of binning of pixels;

FIG. 5a-c conceptually illustrates another example of binning of pixels;

FIG. 6a-e conceptually illustrate the effect of binning;

DETAILED DESCRIPTION OF EXAMPLE EMBODIMENTS

In the present detailed description, various embodiments of the biometric imaging device according to the present invention are mainly described with reference to a biometric imaging device arranged under a display panel. However, it should be noted that the described biometric imaging device also may be used in other biometric imaging applications such as in a biometric imaging devices located under a cover glass or the like.

Figure 1:
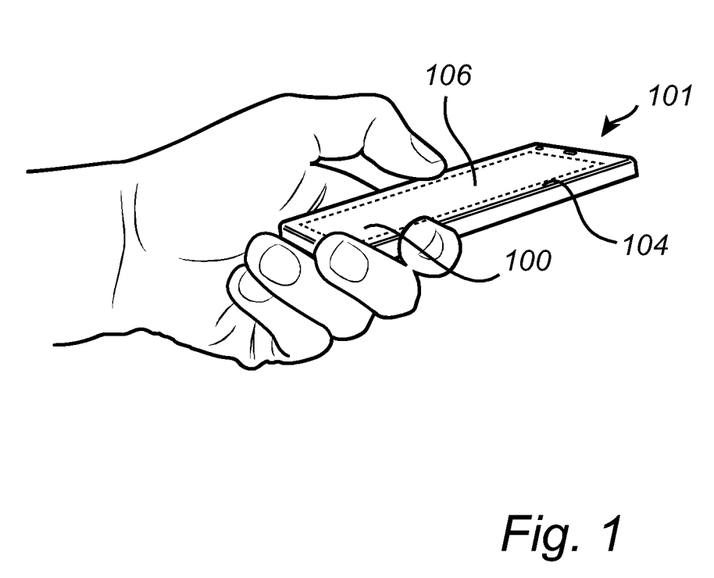
FIG. 1 schematically illustrates an example of an electronic device according to embodiments of the invention.

Turning now to the drawings and in particular to FIG. 1, there is schematically illustrated an example of an electronic device configured to apply the concept according to the present disclosure, in the form of a mobile device 101 with an integrated in-display optical biometric imaging device 100 and a display panel 104 with a touch screen interface 106. The optical biometric imaging device 100 may, for example, be used for unlocking the mobile device 100 and/or for authorizing transactions carried out using the mobile device 100, etc.

The optical biometric imaging device 100 is here shown to be smaller than the display panel 104, but still relatively large, e.g. a large area implementation. In other advantageous implementations the biometric imaging device 100 may be the same size as the display panel 104, i.e. a full display solution. Thus, in such case the user may place his/her finger anywhere on the display panel for biometric authentication. The biometric imaging device 100 may in other possible implementations be smaller than the depicted biometric imaging device, such as providing a hot-zone implementation.

Preferably and as is apparent for the skilled person, the mobile device 101 shown in FIG. 1 may further comprise a first antenna for WLAN/Wi-Fi communication, a second antenna for telecommunication communication, a microphone, a speaker, and a phone control unit. Further hardware elements are of course possibly comprised with the mobile device.

It should furthermore be noted that the invention may be applicable in relation to any other type of electronic devices comprising transparent display panels, such as a laptop, a tablet computer, etc.

Figure 2:
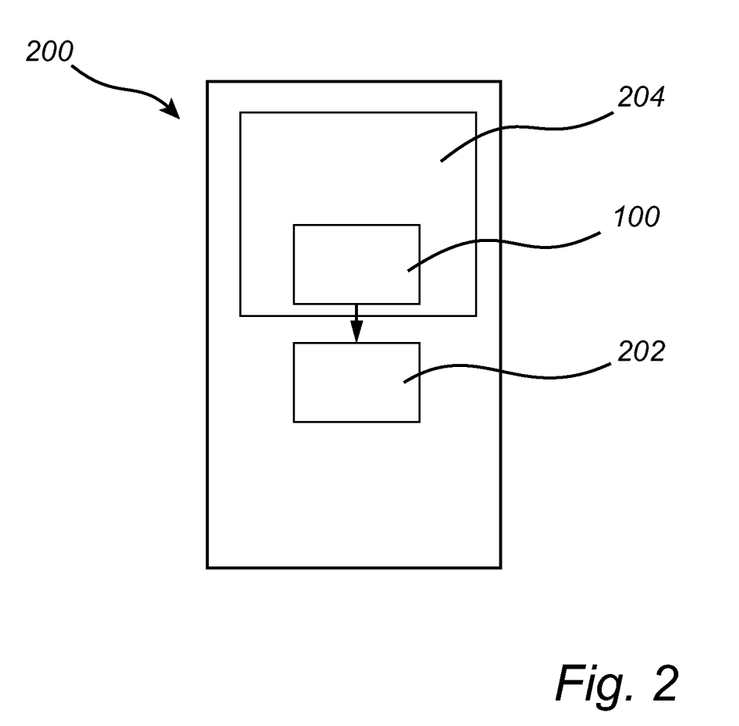
FIG. 2 is a schematic box diagram of an electronic device according to embodiments of the invention.

FIG. 2 is a schematic box diagram of an electronic device 200 according to embodiments of the invention. The electronic device 200 comprises a transparent display panel 204 and an optical biometric imaging device 100 conceptually illustrated to be arranged under the transparent display panel 204. Furthermore, the electronic device 200 comprises processing circuitry such as control unit 202. The control unit 202 may be stand-alone control unit of the electronic device 202, e.g. a device controller. Alternatively, the control unit 202 may be comprised in the optical biometric imaging device 100.

The control unit 202 is configured to receive a signal indicative of a detected object from the biometric imaging device 100. The received signal may comprise image data.

Based on the received signal the control unit 202 is configured to detect a fingerprint, and based on the detected fingerprint the control unit 202 is configured to perform a fingerprint authentication procedure. Such fingerprint authentication procedures are considered per se known to the skilled person and will not be described further herein.

Figure 3A:
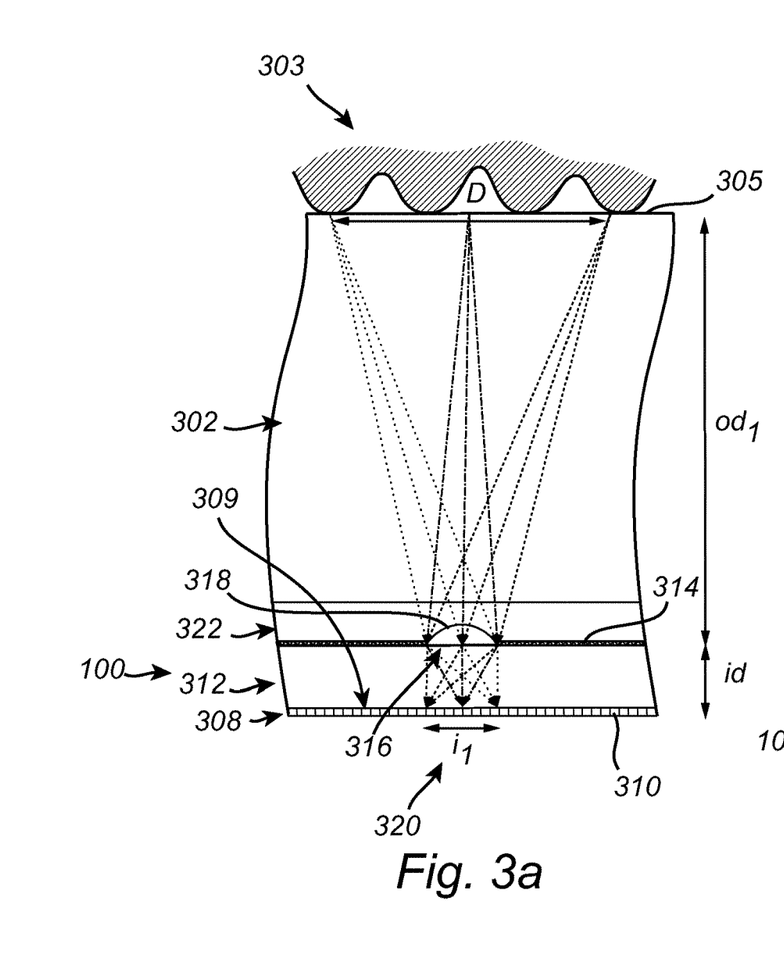
FIG. 3a schematically illustrates a biometric imaging device according to an embodiment of the invention.

FIG. 3a schematically illustrates an optical biometric imaging device 100 according to an embodiment of the invention. The optical biometric imaging device 100 is here arranged under an at least partially transparent display panel 302. However, the biometric imaging device 100 may be arranged under any cover structure which is sufficiently transparent, as long as the image sensor receives a sufficient amount of light to capture an image of a biometric object in contact with the outer surface of the cover structure, such as a fingerprint or a palmprint. In the following, a biometric imaging device 100 configured to capture an image of a finger 303 in contact with an outer surface 305 of the display panel 102 is described.

The biometric imaging device 100 comprises an image sensor 308 comprising a photodetector pixel array 309, where each pixel 310 is an individually controllable photodetector configured to detect an amount of incoming light and to generate an electric signal indicative of the light received by the detector. The image sensor 308 may be any suitable type of image sensor, such as a CMOS or CCD sensor connected to associated control circuitry. The operation and control of such an image sensor can be assumed to be known and will not be discussed herein.

The biometric imaging device 100 further optionally comprises a transparent substrate 312 arranged to cover the image sensor 308, and optionally an opaque layer 314 covering an upper surface of the transparent substrate 312. The optional opaque layer 314 further comprises a plurality of separate openings 316 (only one is shown) arranged at a distance from each other.

In this example embodiment the biometric imaging device comprises an array of microlenses 318 (only one is shown) each arranged in a respective opening 316 of the optional opaque layer 314 and in the same plane as the opaque layer 314. It is however conceivable that the opaque layer 314 and the microlenses 318 are arranged in separate layers. Moreover, the microlens 318 has the same size and shape as the opening 316 to prevent any stray light which has not passed through the microlens 318 from reaching the image sensor 308. It is also conceivable that the microlenses 318 are larger that the openings 316.

Each microlens 318 is configured to redirect light through the transparent substrate 312 and onto a subarray 320 of pixels in the photodetector pixel array 309. Thus, the microlens is configured to define a subarray 320, (320' in FIG. 3b) of pixels which receives light from the corresponding the microlens. The subarrays 320, 320' are here defined as arrays of pixels which receive light from only one microlens 318. It should further be noted that the microlenses 318 and display pixels are not drawn to scale. The microlens 318 is shown to receive light reflected by the finger 303 which has propagated through the display panel 302 before reaching the microlens 318 and the light received by the microlens 318 is focused onto the image sensor 308. Different subarrays 320, 320' of pixels receiving light from the individual microlenses 318 are preferably non-overlapping with adjacent subarrays receiving light from neighboring microlenses.

The biometric imaging device 100 further comprises an intermediate layer 322 located between the opaque layer 314 and the display panel 302. The intermediate layer 322 may for example comprise an adhesive layer used to attach the display panel 302 to the imaging device 100, and a refractive index of the intermediate layer 322 is different from a refractive index of the microlens 318. The intermediate layer comprises an air gap between the transparent display panel and the microlenses 318.

Furthermore, the intermediate layer 322 may also comprise an antireflection coating, an optical filter (e.g. infrared filter) and/or a polarizing filter, which are not illustrated separately herein. It is in general preferable that the refractive index of the microlens 318 is as high as possible and that it is different from the refractive index of any adjacent material above or below the microlens 318.

In FIG. 3a the width D of a portion of the object 303 is indicated. The distance $od_1$ indicates the distance from the light defining elements, here illustrated as the microlens 318, to the object 303. The distance id is the distance between image sensor pixel array 309 and the microlens 318. The demagnification provided by the biometric imaging device 100 provides that the width D is projected onto a width $i_1$ on the pixel array 109, where $i_1$ is given by $$i_1 = D * \frac{id}{od_1}.$$

In order to be able to resolve biometric features it is desirable that the pixel size, including any binning, is smaller than $i_1$ given that D represents the smallest desirable biometric feature to be resolvable. In other words, the projected pixel size which may be given by the demagnification $$\frac{od_1}{id}$$

multiplied by the present pixel size including any binning should be smaller than the smallest desirable biometric feature to be resolvable, preferably less than a desired fraction of the smallest desirable biometric feature to be resolved, e.g. 25%. The projected pixel size may be considered the pixel size in the object plane, i.e. at the object 303. Thus, given the demagnification, it is possible to project the present pixel size including any binning to the object plane. This projected pixel in the object plane should be smaller than the smallest desirable biometric feature to be resolvable. It is possible to determine the pixel size in the object plane from an acquired image.

Figure 3B:
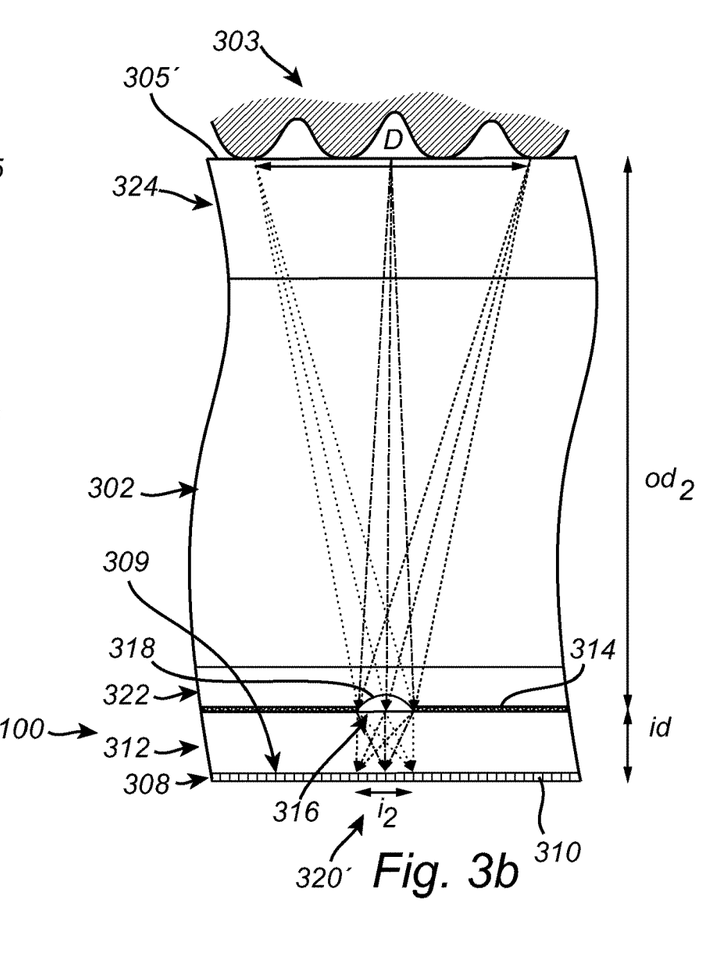

FIG. 3b illustrates a configuration of the biometric imaging device 100 in which the distance $od_1$ shown in FIG. 3a has now changed to a larger distance ode by the addition of e.g. a protection glass 324. The finger 303 is here touching the surface 305' of the protection glass 324. In this case, the demagnification of the biometric imaging device 100 provides that the width D is projected onto a width $i_2$ on the pixel array 309, where $i_2$ is given by $$i_2 = D * \frac{id}{od_2}.$$

This may lead to that the projected pixel size is too large. In other words, the demagnification $$\frac{od_2}{id}$$

multiplied by the present pixel size including any binning is no longer smaller than the desired fraction of the smallest desirable biometric feature to be resolved. This results in a reduced image resolution and reduction in biometric performance. By changing the binning setting, i.e. reducing the number of pixels used in the binning, the present pixel size including the updated binning can be configured so that the projected pixel size is smaller than the desired fraction of the smallest desirable biometric feature to be resolvable.

Figure 4A:
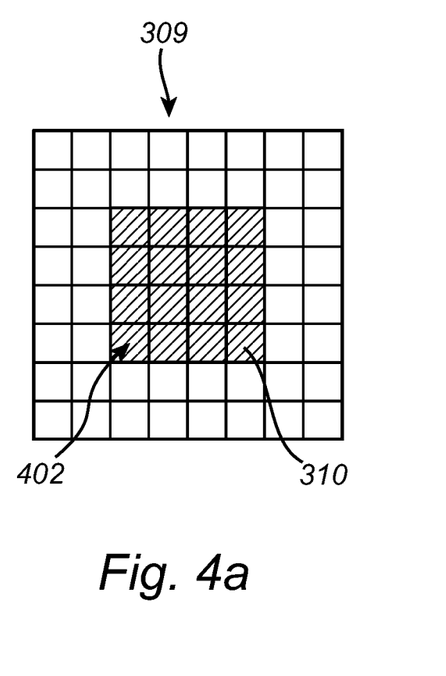
Figure 4B:
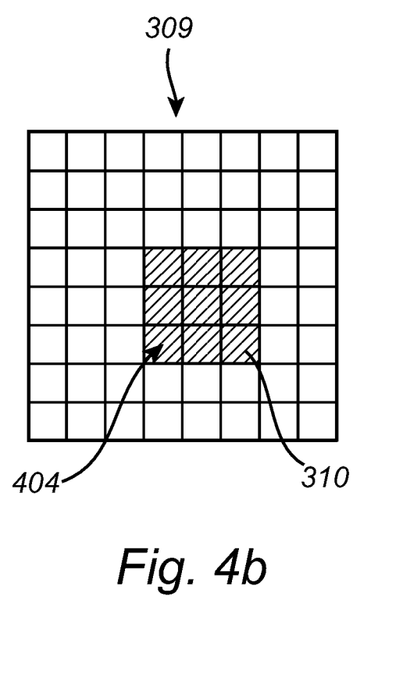
Figure 4C:
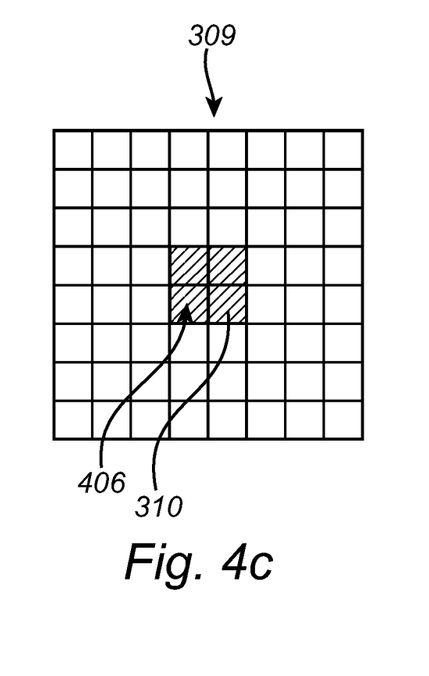

FIGS. 4a-c conceptually illustrates binning by combining a set of pixels into a larger pixel. Each of FIGS. 4a-c illustrates a pixel array 309 with individual pixels 310.

FIG. 4a conceptually illustrates binning of 4×4 pixels 310. This means that the detected signals from the pixels in the 4×4 subarray are combined into a single signal, thus effectively producing a larger pixel comprising the 4×4 pixels. In other words, by binning of pixels 16 signals have been reduced to one, which means less data has to be transferred from the image sensor, but with the cost of reduced image resolution.

If it turns out that the projected pixel size, i.e. the projection of the binned pixels 402 is too large to be able to resolve the desired features, due to changed demagnification, the present disclosure provides to change the binning.

One example of another binning setting is shown in FIG. 4b where the binning setting is to use 3×3 pixels 404 instead of the 4×4 shown in FIG. 4a. In this way the projected pixel size is reduced compared to using the binning shown in FIG. 4a. If the reduction is not sufficient, a further binning setting may be applied to use 2×2 pixels 406 as shown in FIG. 4c.

The total number of pixels is larger in a practical implementation, but the number of shown pixels in the arrays 309 is reduced for clarity in the drawings.

Figure 5A:
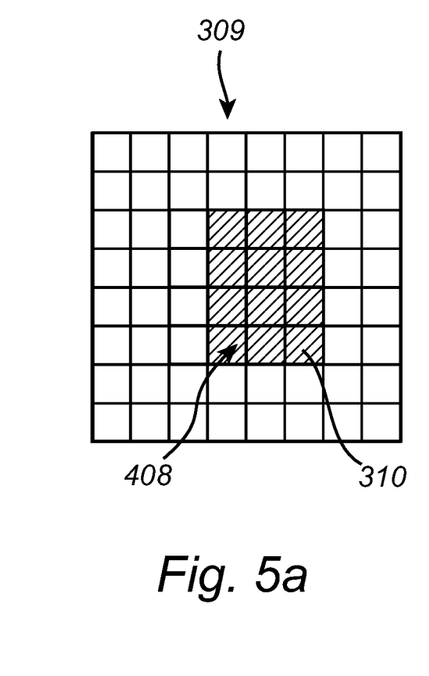
Figure 5B:
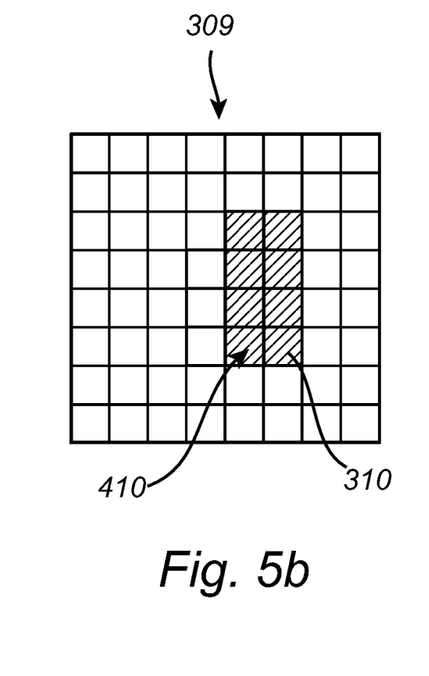
Figure 5C:
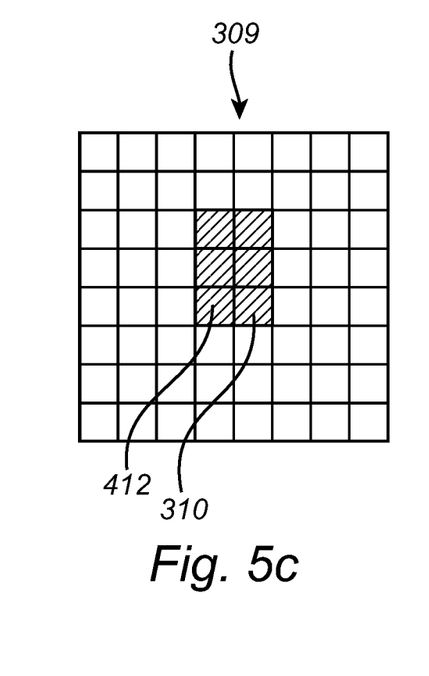

FIGS. 5a-c conceptually illustrates another example of binning by combining a set of pixels into a larger pixel. Each of FIGS. 5a-c illustrates a pixel array 309 with individual pixels 310.

FIG. 5a conceptually illustrates binning of an asymmetric subarray 408 of 4×3 pixels 310. The detected signals from the pixels in the 4×3 subarray are combined into a single signal, thus effectively producing a larger pixel comprising the 4×3 pixels.

As in the case described with reference to FIGS. 4a-c, if the projected pixel size is too large to be able to resolve the desired features, the binning may be altered.

FIG. 5b illustrates one example of altered binning where fewer pixels are used, in this case 4×2 pixels are binned in the subarray 410. If the reduction in the number of pixels used for binning is not sufficient, a further binning setting may be applied to use 3×2 pixels in the binning subarray 412 as shown in FIG. 5c.

Figure 6A:
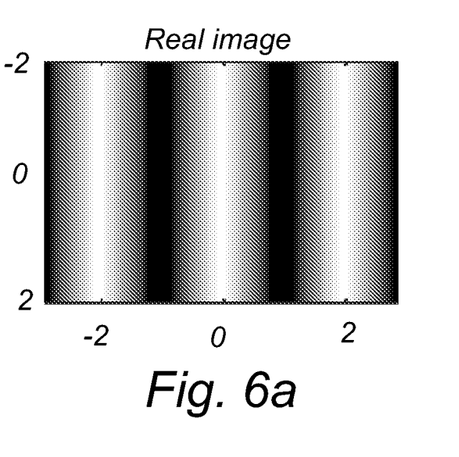

FIG. 6a-e conceptually illustrate the effect of binning. FIG. 6a illustrates the actual light distribution impinging on the image sensor. It is this light distribution that is sampled with the photodetector pixel array using a given binning setting and with the sampling distance given by the pitch of the sensor pixels.

Figure 6B:
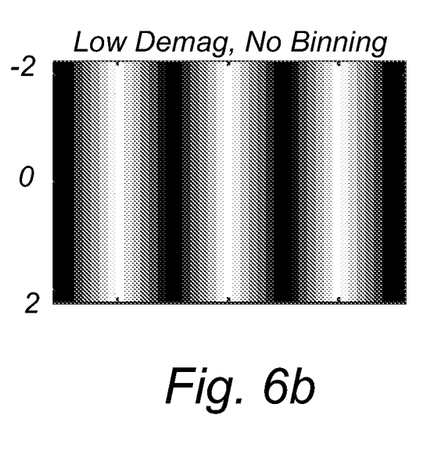
Figure 6C:
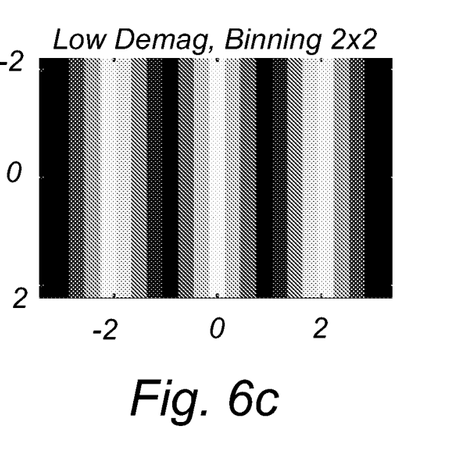

FIG. 6b illustrates the image as sampled when the demagnification is relatively low and with no binning. In other words, the sampling is performed with a 1×1 pixel binning setting. The features from the original light distribution, shown in FIG. 6a, are clearly resolved. Further, FIG. 6c illustrates the image as sampled when the demagnification is relatively low, but with a 2×2 pixel binning setting. The image resolution in FIG. 6c is reduced compared to FIG. 6b, but the features can still be resolved. Thus, using a 2×2 binning with low demagnification (e.g. as shown in FIG. 3a) would reduce the amount of data transferred from the image sensor but still provide sufficient resolution.

Figure 6D:
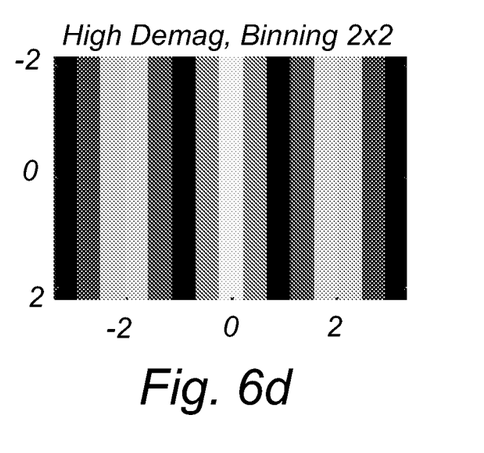

FIG. 6d illustrates the image as sampled when the demagnification is relatively high and with a 2×2 pixel binning setting. With this 2×2 pixel binning setting at the relatively high demagnification, the features from the original light distribution shown in FIG. 6a are barely resolved. In other words, the projected pixel size is too large when using a 2×2 pixel binning setting at this relatively high demagnification.

Figure 6E:
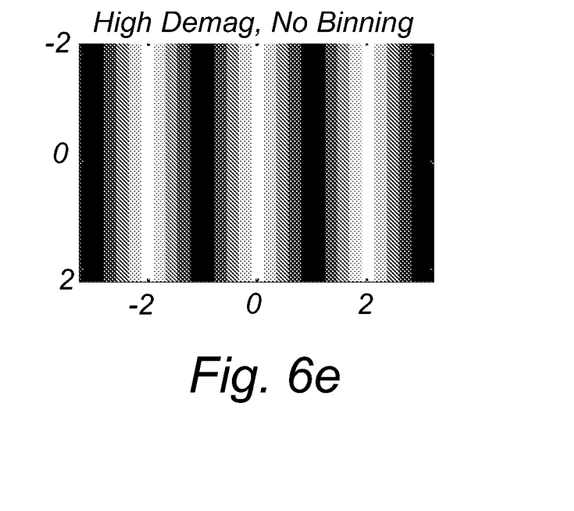

FIG. 6e illustrates the image as sampled when the demagnification is relatively high as in FIG. 6d, but the binning has been reduced by one step to a 1×1 pixel binning setting. With the 1×1 pixel binning setting at the relatively high demagnification, the features from the original light distribution shown in FIG. 6a are again resolvable.

Figure 7:
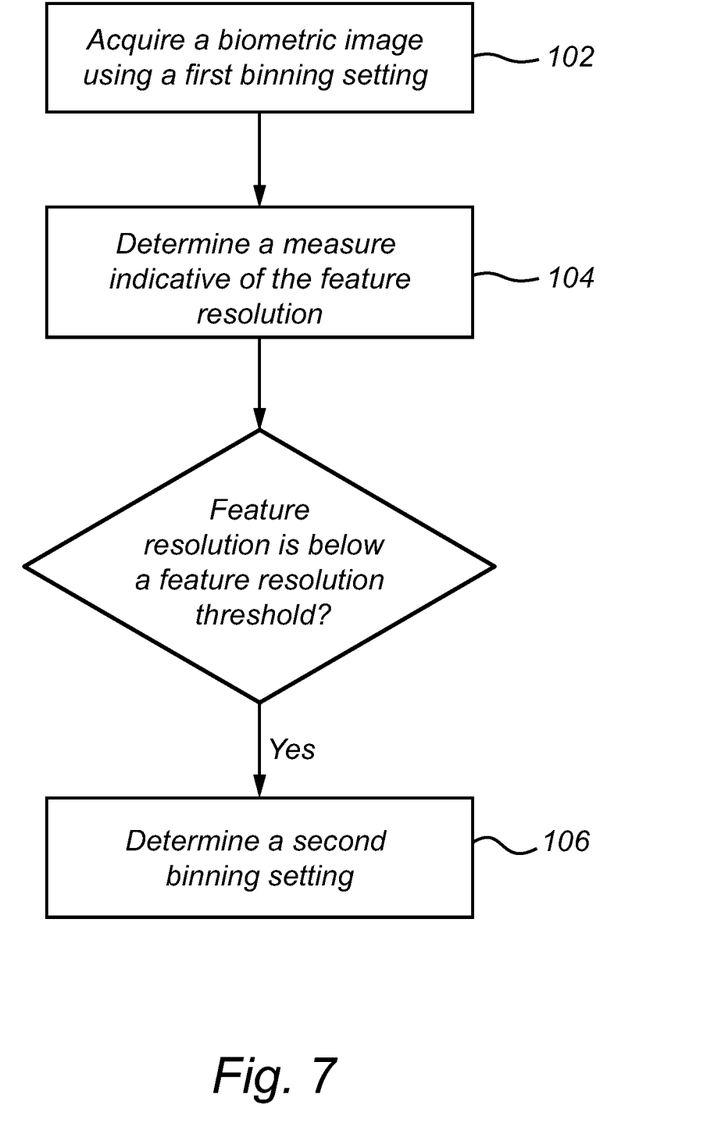
FIG. 7 is a flow-chart of method steps according to embodiments of the invention.

FIG. 7 is a flow-chart of method steps according to embodiments of the invention. In step 102, acquire a biometric image of a biometric object using a first binning setting for binning of detection signals from subarrays of the photodetector pixels into a single pixel value. Subsequently S104, determining a measure indicative of the feature resolution of the biometric image. When the measure indicates that the feature resolution is below a feature resolution threshold, determine S106 a second binning setting adapted to provide a higher feature resolution compared to the feature resolution of the biometric image.

Figure 8:
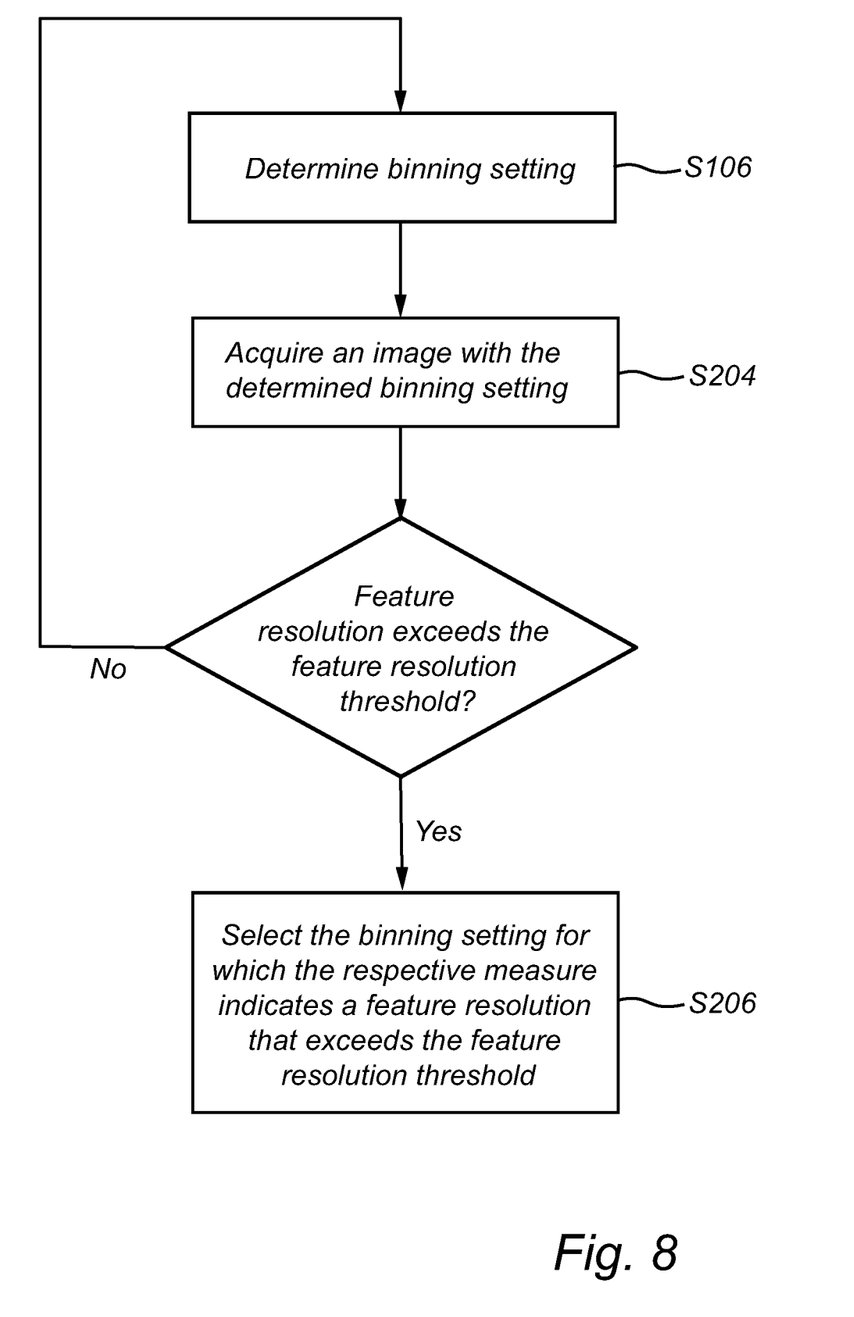
FIG. 8 is a flow-chart of method steps according to embodiments of the invention.

FIG. 8 is a flow-chart of method steps according to embodiments of the invention. From a step S106 has a binning setting been determined. Next, acquiring S204 a further image, e.g. a second image, with the determined binning setting for which a further measure indicative of the feature resolution is determined. If the measure indicates that the feature resolution exceeds the feature resolution threshold, selecting S206 the binning setting for which the measure indicates a feature resolution below the feature resolution threshold. However, if the measure indicates that the feature resolution is below the feature resolution threshold, a further binning setting is determined, in step S106, adapted to provide a higher feature resolution compared to the feature resolution of the previously acquired biometric image.

In other words, FIG. 8 illustrates to acquiring S204 further images with further binning settings for which further measures are determined, until the feature resolution is determined to exceed the feature resolution threshold. When the feature resolution corresponding to a certain binning setting is determined to exceed the feature resolution threshold, selecting S206 that binning setting for which the respective measure indicates a feature resolution that exceeds the feature resolution threshold. The selected binning setting may then be used for acquiring further biometric images used for biometric authentication.

As is understood the binning may also be used to reduce the feature resolution, i.e. changing the binning from what is shown in FIG. 5c (FIG. 4c) to what is shown in FIG. 5b (FIG. 4b), and possibly to what is shown in FIG. 5a (FIG. 4a). This may be advantageous if the projected pixel size is unnecessarily small and the feature resolution is limited by other factors in the biometric imaging device, of if the demagnification factor has decreased, for example due to the distance between the display and the microlens has decreased.

Figure 9:
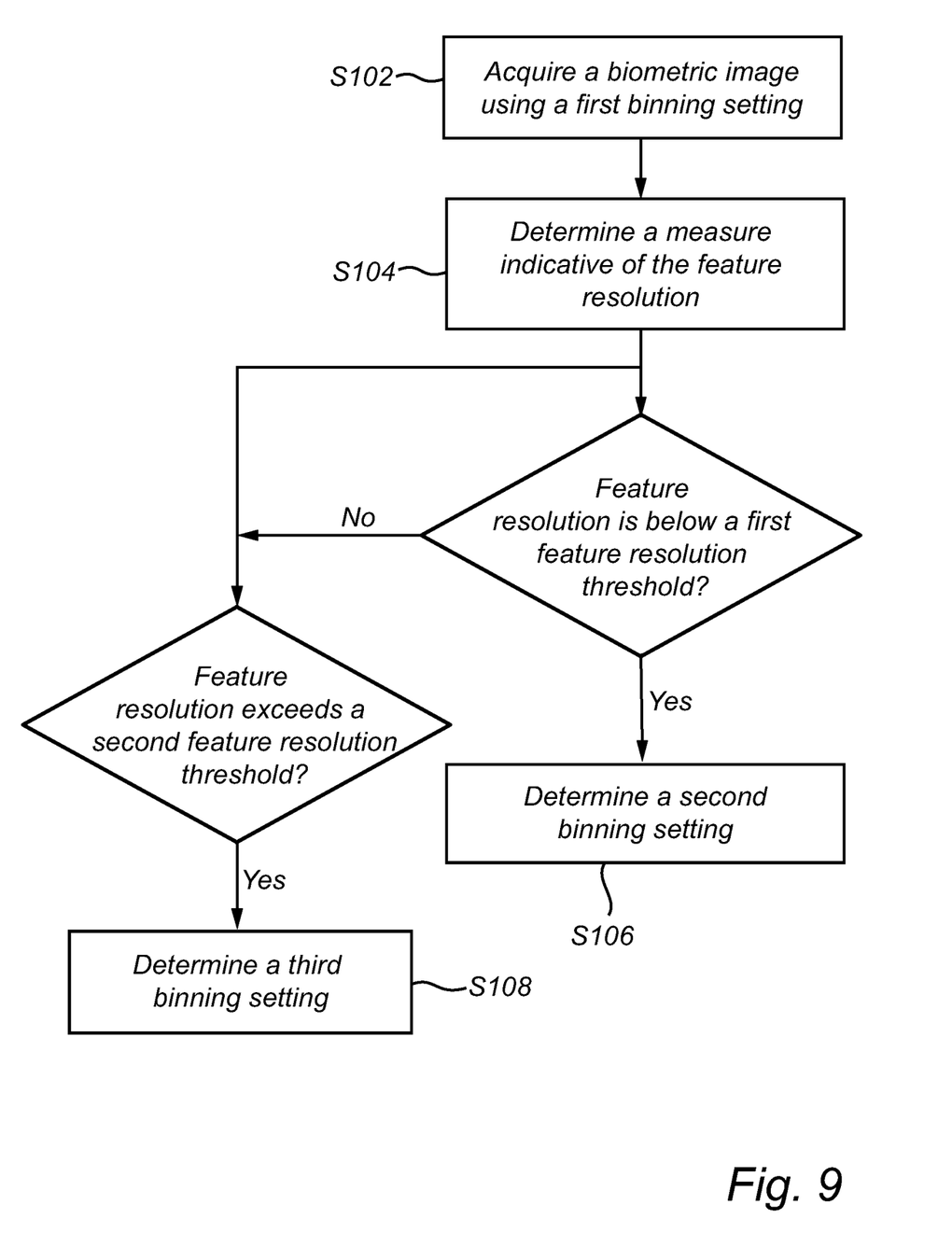
FIG. 9 is a flow-chart of method steps according to embodiments of the invention.

FIG. 9 illustrates a further flow-chart incorporating method steps according to the above. If the feature resolution is determined to be below a first resolution threshold, the step according to the above step S106 is followed. However, if the measure indicates that the feature resolution exceeds a second feature resolution threshold, a third binning setting adapted to provide a lower feature resolution compared to the feature resolution of the biometric image is determined in step S108. If the measure indicates that the feature resolution does not exceed the second feature resolution threshold, the method may return to step S102.

Figure 10:
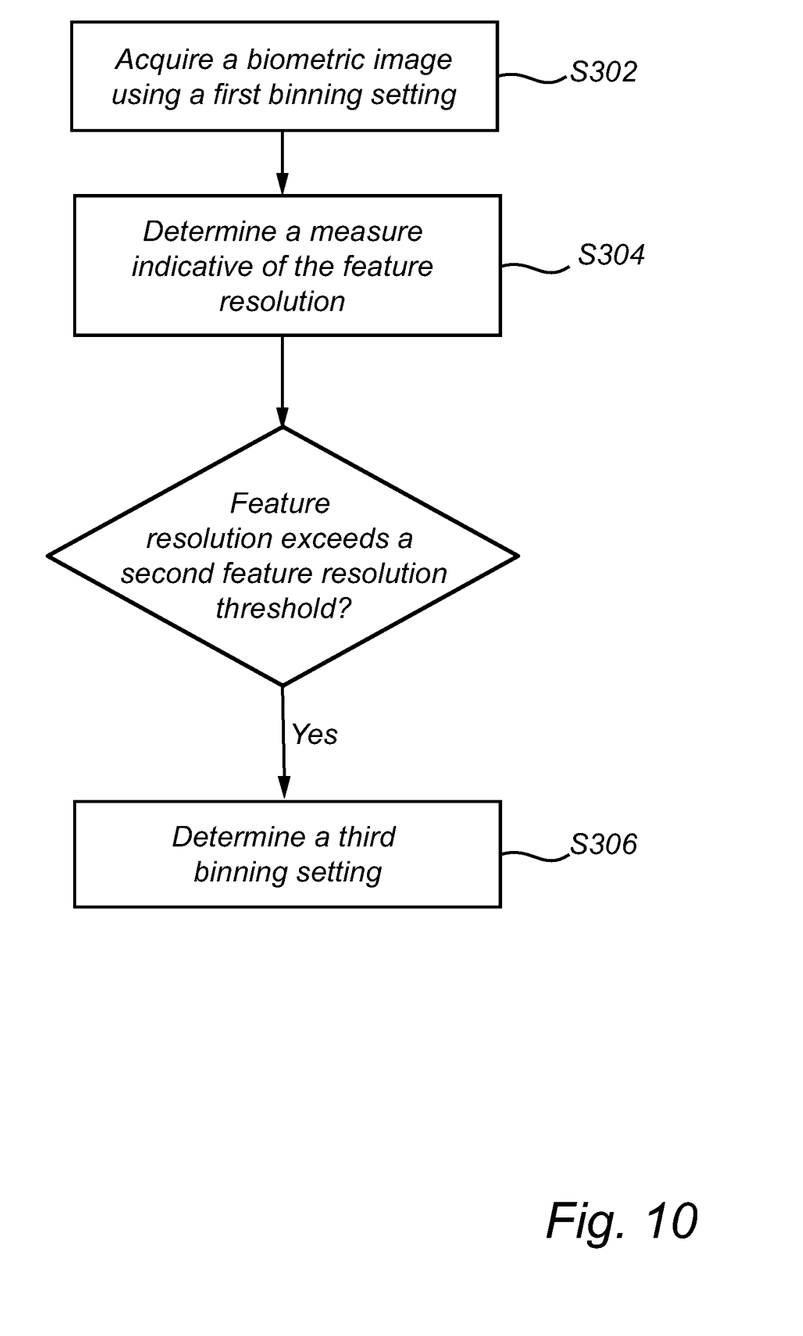
FIG. 10 is a flow-chart of method steps according to embodiments of the invention.

The flow chart in FIG. 10 also illustrates the method steps in accordance with the aspect of reducing the feature resolution. A biometric image of a biometric object is acquired in step S302 using a first binning setting for binning of detection signals from subarrays of the photodetector pixels into a single pixel value. Next, determining S304 a measure indicative of the feature resolution of the biometric image. When the measure indicates that the feature resolution exceeds a second feature resolution threshold determining S306 a third binning setting adapted to provide a lower feature resolution compared to the feature resolution of the biometric image.

In some possible implementations the light defining elements may be comprised of an array of coded aperture elements formed in a transmission mask, an array of pin holes, etc. Thus, the specific configuration of the light defining elements is such that each of them defines a subarray of pixels which receive light from a light defining element and the specific implementation is not limiting to the functionality of the presently disclosed technology including to adaptively change the binning setting.

A control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the biometric imaging device.

Even though the invention has been described with reference to specific exemplifying embodiments thereof, many different alterations, modifications and the like will become apparent for those skilled in the art. Also, it should be noted that parts of the imaging device and method for manufacturing the imaging device may be omitted, interchanged or arranged in various ways, the imaging device yet being able to perform the functionality of the present invention. The microlenses are herein illustrated as plano-convex lenses having the flat surface orientated towards the transparent substrate. It is also possible to use other lens configurations and shapes. A plano-convex lens may for example be arranged with the flat surface towards the display panel, and in one embodiment the lens may be attached to a bottom surface of the display panel even though the imaging performance may be degraded compared to the reverse orientation of the microlens. It is also possible to use other types of lenses such as convex lenses, bi-convex lenses, convex-concave, etc., or multiple lens elements. An advantage of using a plano-convex lens is the ease of manufacturing and assembly provided by a lens having a flat surface.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method of configuring an optical biometric imaging device arranged under an at least partially transparent display panel and configured to capture an image of a biometric object located on an opposite side of the transparent display panel, the optical biometric imaging device comprising a photodetector pixel array, the method comprising:
   acquiring a biometric image of a biometric object using a first binning setting for binning of detection signals from subarrays of the photodetector pixels into a single pixel value, the biometric image having a first feature resolution;
   determining a projected pixel size in an object plane of the optical biometric imaging device from the biometric image;
   determining, when the projected pixel size is larger than a feature resolution threshold corresponding to a smallest desirable biometric feature to be resolvable in the object plane, a second binning setting resulting in a smaller projected pixel size to provide a higher feature resolution compared to the first feature resolution of the biometric image; and
   acquiring a second biometric image of the biometric object using the second binning setting.

2. The method according to claim 1, wherein with the second binning setting, detection signals from fewer pixels are combined compared to with the first binning setting.

3. The method according to claim 1, comprising:
   determining a second projected pixel size in the object plane of the optical biometric imaging device from the second biometric image, the second biometric image having a second feature resolution;
   determining, when the second projected pixel size is larger than the feature resolution threshold, a further binning setting resulting in an even smaller projected pixel size to provide a higher feature resolution compared to the second feature resolution of the second biometric image.

4. The method according to claim 3, comprising:
   acquiring further images with further binning settings for which further projected pixel sizes are determined, until the projected pixel size is smaller than the feature resolution threshold,
   selecting the binning setting for which the respective projected pixel size is smaller than the feature resolution threshold.

5. The method according to claim 4, wherein subsequent binning settings reduces the number of rows of pixels in each bin by one, and the number of columns of pixels by one.

6. The method according to claim 4, wherein subsequent binning settings reduces the number of rows of pixels in each bin by more than one, and the number of columns of pixels by more than one.

7. The method according to claim 1, wherein each subarray of photodetector pixels is square, rectangular, or circular subarray.

8. The method according to claim 1, further comprising:
   determining, when the projected pixel size is smaller than a second feature resolution threshold, a third binning setting adapted resulting in a larger projected pixel size to provide a lower feature resolution compared to the first feature resolution of the biometric image.

9. The method according to claim 8, wherein the feature resolution threshold is a first feature resolution threshold, wherein the second feature resolution threshold is indicative of a higher feature resolution than the first feature resolution.

10. An optical biometric imaging device configured to be arranged under an at least partially transparent display panel and configured to capture an image of an object located on an opposite side of the transparent display panel, the biometric imaging device comprising:
   an image sensor comprising a photodetector pixel array;
   an array of light defining elements, wherein each light defining element is configured to define a subarray of pixels which receives light from the corresponding light defining element,
   one or more processors connected to the image sensor and configured to:
      control the image sensor to acquire a first biometric image of a biometric object using a first binning setting for binning of detection signals from subarrays of the photodetector pixels into a single pixel value, the first biometric image having a first feature resolution;
      determine a projected pixel size in an object plane of the optical biometric imaging device from the first biometric image,
      determine, when the projected pixel size is larger than a feature resolution threshold corresponding to a smallest desirable biometric feature to be resolvable in the object plane, a second binning setting resulting in a smaller projected pixel size to provide a higher feature resolution compared to the first feature resolution of the first biometric image; and
      control the image sensor to acquire a second biometric image of the biometric object using the second binning setting.

11. The optical biometric imaging device according to claim 10, wherein the light defining elements are microlenses.

12. The optical biometric imaging device according to claim 11, wherein each microlens is configured to redirect light onto a corresponding subarray of pixels in the photodetector pixel array.

13. The optical biometric imaging device according to claim 10, configured as an optical fingerprint imaging device.

14. An electronic device comprising:
   a transparent display panel;
   the optical biometric imaging device according to claim 10, and
   processing circuitry configured to:
      receive a signal from the optical biometric imaging device indicative of a fingerprint of a finger touching the transparent display panel,
      perform a fingerprint authentication procedure based on the detected fingerprint.

15. The electronic device according to claim 14, wherein the electronic device is a mobile device.

16. A computer program product comprising a non-transitory computer readable medium having stored thereon a computer program for controlling an optical biometric imaging device arranged under an at least partially transparent display panel and configured to capture an image of a biometric object located on an opposite side of the transparent display panel, the optical biometric imaging device comprising an image sensor and one or more processors, wherein the computer program product comprises:
   code for determining a projected pixel size in an object plane of the optical biometric imaging device from a biometric image acquired with a first binning setting, the biometric image having a first feature resolution; and
   code for determining, when the projected pixel size is larger than a feature resolution threshold corresponding to a smallest desirable biometric feature to be resolvable in the object plane, a second binning setting resulting in a smaller projected pixel size to provide a higher feature resolution compared to the first feature resolution of the biometric image; and
   code for controlling the image sensor to acquire a second biometric image of the biometric object using the second binning setting.

17. A method of configuring an optical biometric imaging device arranged under an at least partially transparent display panel and configured to capture an image of a biometric object located on an opposite side of the transparent display panel, the optical biometric imaging device comprising a photodetector pixel array, the method comprising:
   acquiring a biometric image of a biometric object using a first binning setting for binning of detection signals from subarrays of the photodetector pixels into a single pixel value, the biometric image having a first feature resolution;
   determining a projected pixel size in an object plane of the optical biometric imaging device from the biometric image; and
   determining, when the projected pixel size is smaller than a second feature resolution threshold corresponding to a smallest desirable biometric feature to be resolvable in the object plane, a third binning setting resulting in a larger projected pixel size to provide a lower feature resolution compared to the first feature resolution of the biometric image;
   acquiring a biometric image of the biometric object using the third binning setting.

* * * * *